United States Patent [19]

Peters

[11] 3,712,386
[45] Jan. 23, 1973

[54] PNEUMATIC HAND TOOL HAVING AUTOMATIC COLLET AND BRAKE

[76] Inventor: Rudolph W. Peters, 5786 Balmoral Drive, Oakland, Calif. 94619

[22] Filed: March 1, 1971

[21] Appl. No.: 119,691

[52] U.S. Cl. ................... 173/46, 128/305, 173/163, 279/4, 415/123, 415/503
[51] Int. Cl. .............................. A61c 1/05, A61c 1/14
[58] Field of Search ............. 173/46, 163; 279/1 B, 4; 415/123, 503; 128/303, 305; 192/.07, .096

[56]  References Cited

UNITED STATES PATENTS

| | | | |
|---|---|---|---|
| 3,052,984 | 9/1962 | Mitthauer et al. | 415/123 X |
| 3,631,597 | 9/1969 | Lieb et al. | 32/26 |
| 2,138,342 | 11/1938 | Dickenson | 279/4 |
| 3,128,079 | 4/1964 | De Groff | 415/123 |

*Primary Examiner*—Ernest R. Purser
*Attorney*—Harris Zimmerman

[57]  ABSTRACT

An improved pneumatic hand tool having an automatic collet and brake arrangement is described. The tool includes an air motor for rotatably driving a spindle on the end of which is located a collet for gripping the shank of a tool implement it is desired to rotate. A collet draw bar extends from the rear end of the collet axially through the spindle beyond the air motor and terminates in an enlarged portion which is adapted to be engaged by a piston. The piston is constrained for axial movement within a cylinder at the end of the air motor and, in response to the application of fluid pressure thereto, engages the collet draw bar and drives the collet outwardly from the spindle in order to open the same for reception of the shank of the tool. The tool includes a multi-port valve which selectively directs fluid either to the air motor for rotating the spindle or to the piston for opening the collet. A compression spring is also provided for urging the piston into frictional engagement with the end of the draw bar whenever air pressure is diverted from the motor, so that the piston acts as a brake to the rotation of the draw bar and, hence, to the rotation of the collet and its associated tool.

11 Claims, 6 Drawing Figures

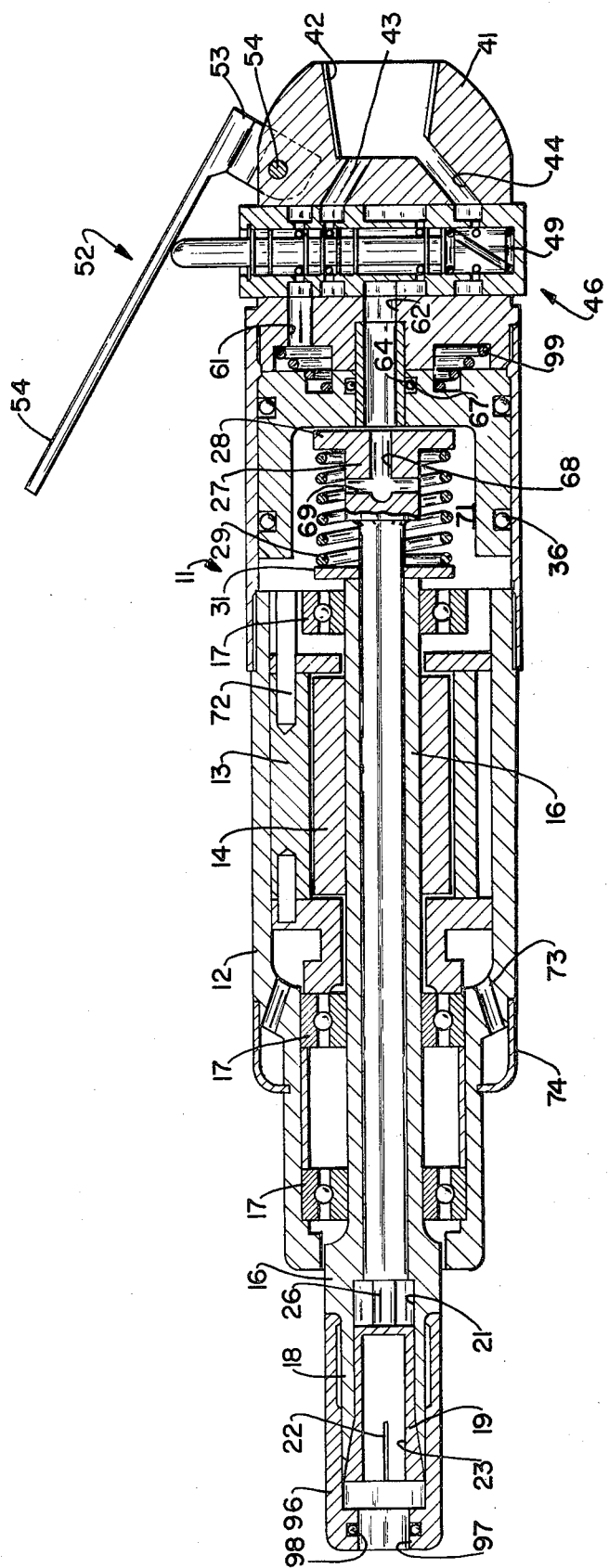
FIG_1

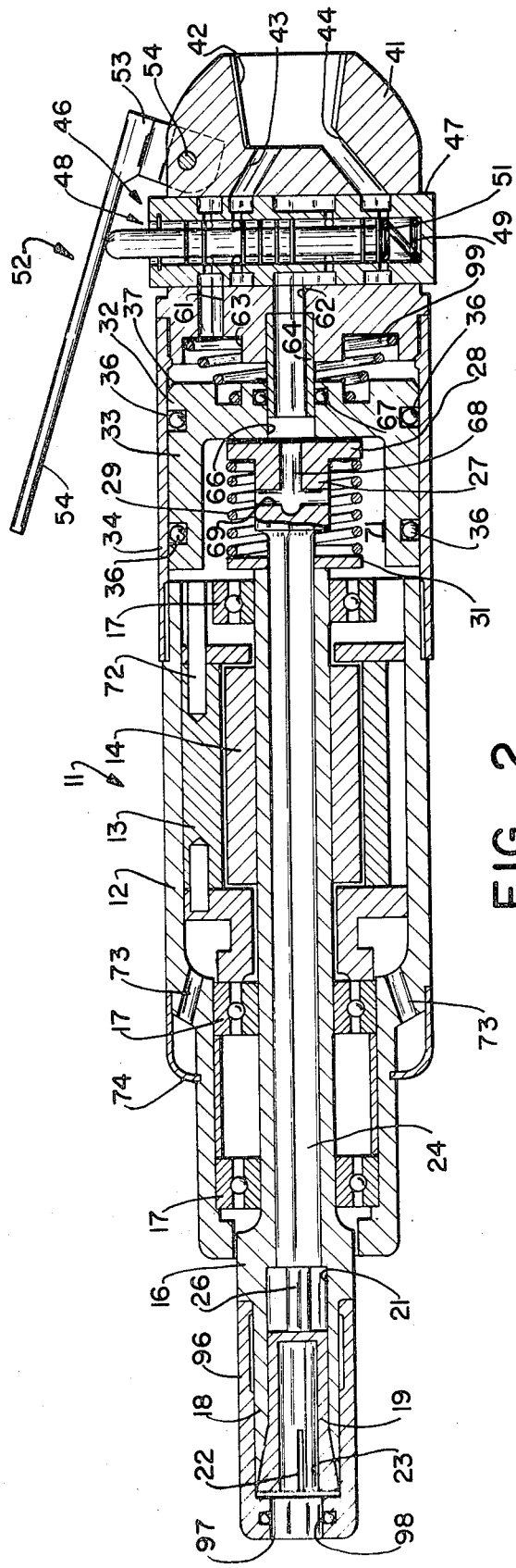
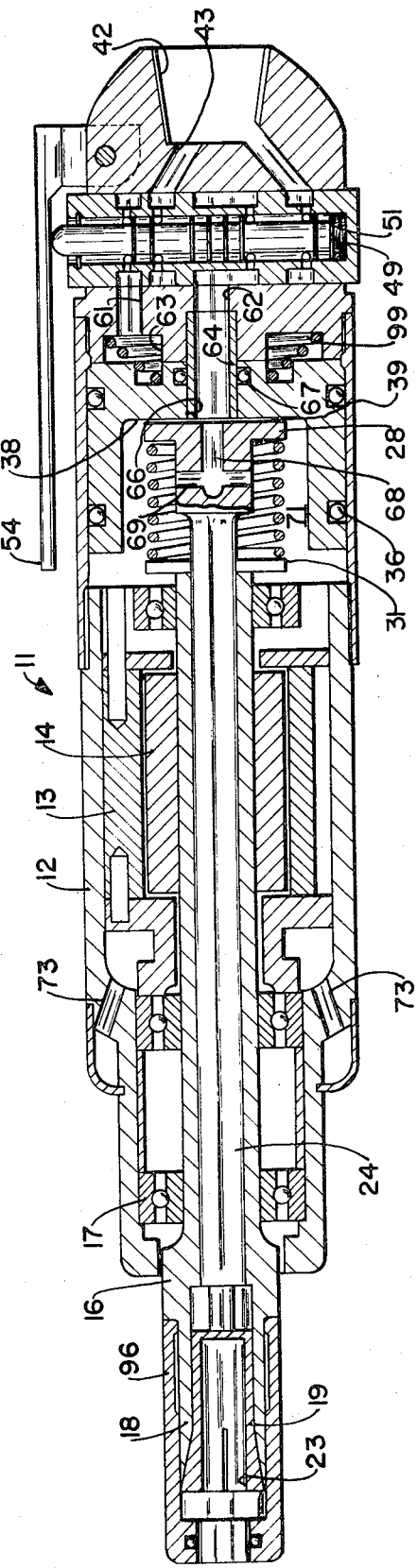

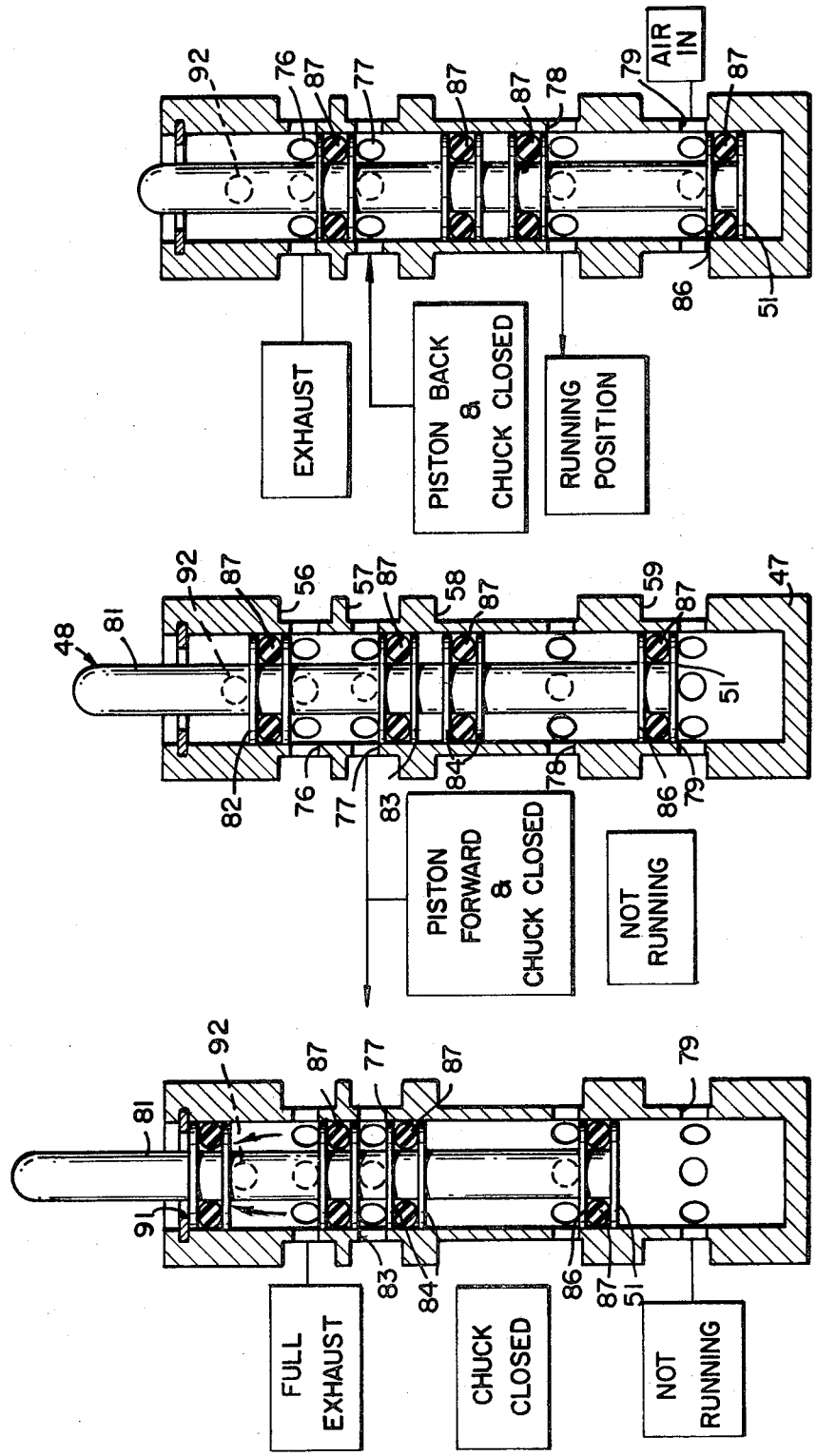

PNEUMATIC HAND TOOL HAVING AUTOMATIC COLLET AND BRAKE

BACKGROUND OF THE INVENTION

This invention relates to fluid pressure operated hand tools for rotating tool implements such as small grinding stones and, more particularly, to such a tool having means simplifying the operation of changing the tool to be rotated.

Pneumatically operated hand tools which provide rotary motion find wide usage in industry, medicine, and dentistry. For example, small pneumatic rotary tools are used in industry to rotate milling stones or the like for grinding die cavities or finishing surfaces. Most of such tools include a collet or similar gripping means for holding the shank of the tool implement, such as the milling stone, so that an operator can change or replace tool implements as desired.

It will be appreciated that the collet or chuck providing the securance of a tool implement to the device for rotation must provide a positive securance which can resist the torsional forces applied to the securing arrangement when the device is in use. In order to provide this positive securance, as well as for other reasons, most pneumatic tools of this type include a mechanical arrangement for tightening the gripping means onto the shank of the tool implement. The time consumed in manipulating the mechanical tightening arrangements now available can be significant and appreciably add to the labor expense, especially in those uses of a pneumatic tool in which the tool implement must be often changed. Moreover, most of such tools provide a relatively high speed rotation, and an operator must wait for the spindle of the tool to slow down before he can change the tool implement. The time required for the tool spindle to coast to a slower speed must also be taken into account in considering the time and trouble involved in changing tool implements. While attempts have been made to simplify the mechanical gripping and tightening mechanisms without impairing the integrity of the securance obtained, they have not been altogether successful.

SUMMARY OF THE INVENTION

The present invention is a fluid pressure operated hand tool which includes means for automatically opening and closing a collet or other gripping means to facilitate the rapid changing of the tool implement to be rotated thereby. In its basic aspects, the hand tool comprises a gripping means having jaws, as is usual, for gripping the shank of a tool implement or the like to which it is desired to impart rotary motion. The hand tool also includes driver means, such as an air motor, which is responsive to the application of fluid pressure by rotating the gripping means. A valve and valve actuating means are provided for enabling an operator to selectively direct fluid pressure from a source to the driver means for powering the same.

As a salient feature of the combination, the power tool also includes means operable by fluid pressure for activating the jaws of the gripping means to a release position enabling insertion of a shank of a tool or the like. Thus, the invention makes use of the fluid pressure which is available to rotate the tool implement to also provide the necessary activation of the gripping means to enable changing of a tool. Most desirably, this is simply accomplished by providing the valve which is for selectively directing fluid pressure to the driver with an additional mode for directing the fluid pressure to the means which activates the jaws of the tool. Also for simplicity, the external control or actuating means provided on the tool for operating the valve to selectively power the driver is preferably also arranged to activate the valve to direct the necessary pressure to the jaw activating means.

The tool of the invention also most desirably includes means which brakes rotation of the spindle and, thus, rotation of any tool held thereby, on deactivation of the driver means. Besides such braking enabling one to change a tool immediately after the driver means is deactivated, it assures that when the collet is automatically brought to the tool releasing position, such collet is not rotating and does not tend to fling any tool engaged by it. Such braking means therefore cooperates with the tool implement releasing means in providing quick and simple changing of a tool.

THE DRAWINGS

With reference to the accompanying three sheets of drawings:

FIG. 1 is a longitudinal cross-sectional view through a preferred embodiment of a pneumatic hand tool of the invention;

FIG. 2 is another cross-sectional view of the preferred embodiment of FIG. 1 illustrating the same when it has been actuated to the tool implement releasing position;

FIG. 3 is a third longitudinal cross-sectional view of the preferred embodiment of FIG. 1 illustrating the same activated to provide rotary motion to a tool implement;

FIG. 4 is an enlarged sectional view of the valve portion of the preferred embodiment for controlling the application of fluid pressure to the various mechanisms of the tool, such valve being shown in a fully deactivated mode corresponding to FIG. 1;

FIG. 5 is another enlarged sectional view of the valve portion shown in FIG. 4 and illustrating the same actuated to provide fluid pressure for the tool releasing mode of the apparatus shown in FIG. 2; and FIG. 6 is a third enlarged sectional view of the valve portion illustrating it actuated to the tool implement rotation mode of FIG. 3.

DETAILED DESCRIPTION OF THE PREFERRED EMBODIMENT

Reference is first made to FIGS. 1-3 which are cross-sectional views longitudinally through a preferred embodiment of a pneumatic hand tool of the invention, generally referred to by the reference numeral 11. In general, the tool 11 includes an outer cylindrical casing 12 which is adapted to be hand held and which encloses a conventional air motor 13. The rotor 14 of the air motor is secured to a spindle 16 for rotation thereof. As is illustrated, spindle 16 is axially supported within the housing 12 for rotation by bearings 17 and has a nose end 18 which projects outwardly therefrom for cooperation with a collet 19 to grip the shank of a tool implement or the like and rotate the same. More particularly, the nose end 18 of the spindle has a bore 21 extending axially thereinto and in which the collet 19 is slidably received. As is conventional, the forward or gripping end of the collet 19 is slotted as at 22 to provide a plurality of circumferentially disposed jaw elements 23. Moreover, the exterior peripheral surface of the collet tapers outwardly toward the free end of the collet, and the interior surface of the bore 21 within the spindle is provided with a complementary outwardly tapering surface adjacent its end. As is conventional, when the collet 19 and bore 21 are in the relative positions shown in FIGS. 1 and 3, i.e., the collet is withdrawn into the bore, the tapering surfaces cooperate to force the jaw elements 23 of the collet radially inward for gripping engagement with the shank of a tool it is desired to rotate. However, when the collet is in a position outwardly of the bore, such as in the position depicted in FIG. 2, the complementarily tapered surfaces are disengaged from one another and the jaw elements 23 of the collet can move to their original, non-deformed position in which they are open for the reception of the shank of a tool.

Means are provided for imparting axial motion to the collet 19 to move the same into and out of the bore 21 as desired. More particularly, an elongated collet draw bar 24 is threadably secured via a shank 26 to the inner end of collet 19 and extends axially through the spindle 16 to a location within the casing 12 beyond the motor 13. As is illustrated, the free end of the draw bar 24 terminates in an enlarged diameter portion 27 having at its end a disc shaped flange 28. Means are provided cooperable with the draw bar 24 for normally maintaining the collet in its withdrawn position within the bore 21 of the spindle and, hence, maintaining the jaws thereof in clamping engagement with the shank of a tool implement or the like received therein. That is, a compression spring 29 is constrained in compression between the disc flange 28 on the end of the draw bar 24 and an opposing annular flange 31 on the adjacent end of the spindle 16. It will be appreciated that the expansional force provided by the spring 29 will urge the draw bar 24 to the right relative to the spindle as viewed in the drawings and, thus, resiliently urge the collet 19 into its retracted or tool shank clamping position within bore 21. The force provided by the spring 29 should be chosen to assure that the gripping power of the collet is sufficient to resist the torsional forces to which the joint between the collet and the shank of the tool implement will be subjected during use of the tool.

As previously indicated, the invention includes an arrangement by which the jaw elements 23 of the collet can be automatically brought to the tool implement releasing position illustrated in FIG. 2. For this purpose, the invention includes release means responsive to a predetermined change in fluid pressure by providing the desired activation of the jaws to the release position. More particularly, a piston 32 is positioned within the casing 12 rearwardly of the air motor 13. Such piston 32 includes a cylindrical skirt 33 which sealingly engages the inner surface of a cylindrical portion 34 of the casing 12 also located rearwardly of the air motor 13. The sealing engagement is provided, for example, by "O" rings 36 which do not materially hinder the axial movement of the piston 33 within the cylindrical portion 34.

Upon pneumatic pressure being applied to the face 37 of the piston, the piston is moved axially forward within the cylindrical portion 34, and its surface 38 engages an opposing surface 39 provided by the flange 28 on the free end of the collet bar 24. It will be appreciated that if greater than a predetermined pressure is applied to the face 37, the piston 32 will engage the free end of the collet bar 24 and move such draw bar axially to the left against the force of spring 29, and, hence, drive the collet 19 outwardly of the bore 21. This movement disengages the complementary tapering surfaces of the bore and collet to allow the jaws of the collet to open for reception of the shank of the tool. As previously mentioned, this particular state of the arrangement is depicted in FIG. 2.

As is conventional, the apparatus of the invention includes a valve arrangement for selectively directing fluid pressure to the air motor to power the same and thereby rotate the spindle when desired. As another salient feature of the invention, though, the valve means provided for this purpose is also designed to direct fluid pressure to drive the piston 32 and, hence, provide automatic movement of the collet to its toll releasing position. Moreover, the same actuator provided for controlling the valve to operate the air motor 13 is also used to actuate the valve to apply pressure to the face 37 of the piston 32. To these ends, the hand tool of the invention is provided with a rear head portion 41 which closes the rear end of cylindrical casing portion 34 and extends rearwardly thereof. As is illustrated, the head portion 41 is provided with an enlarged axial opening 42 adjacent its rear for reception of a standard fitting or the like to connect to the tool an air hose leading from an external source pressure. A pair of inlet passages 43 and 44, respectively, extends into the head 41 from the opening 42 to locations adjacent inlets of a multi-port, sequence valve which is generally referred to in the drawings by the reference numeral 46. The valve 46 comprises a tubular housing 47 which is received within a laterally extending bore in the head 41. A valve spool 48 for controlling fluid flow is received within the tubular housing 47 and is resiliently urged upward to a valve deactivated position by a compression spring 49 located between he bottom wall of the housing 47 and an end disc 51 on the spool.

The actuating means for manually operating the valve does so by enabling an operator to depress the spool 48 into the valve housing 47 to change its location therein and, as will be explained hereinafter, thus change its mode. For this purpose an actuating lever 52 is provided having an inverted U-shaped yoke 53 at one end pivotally secured via a pin 54 to the rear head portion 41. An operating arm 54 of the lever 52 projects forwardly from the yoke 53 and extends above the upper free end of the spool 48. It will be seen that depression of the arm 54 will result in the same engaging the spool and urging it axially into the housing 47 against the pressure of spring 49. The lever arm is movable from the non-depressed position illustrated in FIG. 1 in which the valve is not actuated through the intermediate position illustrated in FIG. 2 to the fully depressed position shown in FIG. 3. The compression spring 49 will return the spool to its non-depressed position upon release of pressure applied by an operator to the actuating lever.

In moving the actuating lever 54 between the three positions illustrated in FIGS. 1–3, an operator causes the valve to likewise be adjusted between three alternative modes. In this connection, it is to be noted that the exterior cylindrical surface of the valve housing 47 is provided with four circumferentially extending groove passageways 56, 57, 58, and 59, respectively. THe previously mentioned inlet passages 43 and 44 communicate with the annular passageways 57 and 59, and the other two annular groove passageways, passageways 56 and 58 respectively communicate with valve outlet passages 61 and 62 which extend forwardly from the valve housing through the head portion 41. The outlet passage 61 communicates with an annular pressure chamber 63 which is coaxial with the piston 32 and is open to the face 37 of such piston for the application of pressure introduced therein onto such face. The other one of the outlet passages, passage 62 has a tubular insert 64 received in its forward end and projecting outwardly therefrom. The piston 32 is slidably received on the projecting end of the insert 64 via an axial bore 66 which extends therethrough. An "O" ring 67 provides sealing engagement between the exterior periphery of the insert and the piston while yet allowing the position to be moved slidably along the insert.

The purpose of the insert 64 is to provide a continuation of the outlet passage 62 from the rear head 41 through the piston to the opposite side thereof. As is illustrated, the enlarged end portion 27 of the draw bar 24 is provided with a passage 68 which is in alignment with the axial bore 66 through the piston and which terminates in laterally extending passageways 69 which communicate with the chamber 71 forwardly of the rear face 38 of the piston 32. Fluid pressure produced into the chamber 71 can communicate with the vanes of the rotor of the air motor via passage 72 in the end of the motor. After causing rotation of the motor rotor, and of thus the spindle 16, the fluid providing the pressure is exhausted via exhaust ports 73 extending through the casing 12 at the forward end of the motor. Deflectors 74 are provided at the exist of such exhaust ports to break up the exhaust streams.

The enlarged views of the control valve provided by FIGS. 4–6 are included to facilitate an understanding of the manner in which the valve can selectively direct fluid pressure to the face 37 of the piston 32 or to the air motor 13. With reference to such figures, it will be seen that each of the groove passageways 56–59 are respectively provided with apertures 76–79 extending therefrom into the interior of the tubular valve housing. The valve spool 48 includes an elongated rod 81 which extends axially into the cylindrical cavity provided by the tubular valve housing 47. As is illustrated, pairs 82, 83, and 84 of retainer rings are distributed along the length of the rod 81, and a retainer ring 86 is spaced above the end disc 51. Each pair of retainer rings 82–84 and the retainer ring 86 and end disc 51 extend outwardly to adjacent the wall of the valve cavity and retain "O" rings 87 which provide sealing engagement between the valve cavity wall and the rod 81 at the locations of the retainer rings. The sealing discs thus provided along the rod 81 divide the valve cavity into discrete sections. The location of such sections along the length of the cavity varies, however, depending upon the location of the spool within the valve housing.

FIG. 4 depicts the relative positioning of the spool 48 within the valve housing when the tool of the invention is in the unactuated position depicted in FIG. 1. When the valve is in such position and the tool is connected to an external source of pressure, pressure from the source introduced to the valve through the inlet passageway 44 communicates via the apertures 79 with that portion of the valve cavity beneath the end disc 51. However, such pressure is prevented from communicating with the remainder of the cavity above the disc 51 in view of the "O" ring 87 retained by such disc and the retainer ring 86. The pressure introduced to the valve through the inlet passageway 43 communicates with the valve cavity through the apertures 77. As is illustrated, though, the apertures 77 are isolated from the remainder of the valve cavity by the "O" rings 87 respectively retained by the retainer ring pairs 83 and 84. Thus, when the valve is in the position depicted, it blocks communication between the external source of pressure and either the air motor or the collet release piston 32. It should be noted that when the valve is in such position, the spool 48 is retained within the cavity by a keeper washer 91 received within a circumferential groove in the wall of the valve cavity adjacent its open upper end.

FIG. 5 depicts the position of the valve spool 48 within the valve cavity when the actuator lever 52 is depressed to the position illustrated in FIG. 2. It is when the actuating lever is depressed to this intermediate position that the collet is moved outwardly of the spindle and thereby opened. More particularly, with reference to FIG. 5, it will be seen that when the valve spool is in the partly depressed condition shown, the "O" ring 87 retained between the end disc 51 and retainer ring 86 will still block communication to the remainder of the valve cavity of pressure introduced into the cavity below the end disc from passageway 44. The result is such pressure is prevented by the valve from reaching the air motor to drive the same. However, it will be seen that the retainer ring pair 83 and its associated "O" ring 87 is now moved to a position below the apertures 77 in the valve housing communicating with the inlet passageway 43. Moreover, the apertures 76 leading from the valve cavity to the passageway 61 are in that section of the valve cavity defined between the retainer ring pairs 82 and 83, respectively. The result is that pressure communicated to such section through the apertures 77 is introduced via the apertures 76 and passageway 61 to the annular chamber 63 adjacent the face 37 of the piston 32. Such pressure will bear against the piston face 37 and drive the piston axially forward in the housing and against the flange 28 on the end of collet bar 24. With such pressure providing a force against the piston in the forward direction which is greater than the resisting force provided by the compression spring 29, the piston will drive the collet via the draw bar 24 outwardly of the spindle bore 21 to disengage the complementary tapering surfaces and allow the jaws of the collet to open for reception of the shank of a tool. This particular state of the tool is depicted in FIG. 2.

When the actuating lever 52 is brought to its fully depressed position depicted in FIG. 3, the valve blocks communication between the external source of pressure and the piston face 37 while simultaneously providing communication between such source of pressure and the air motor. More particularly, as is illustrated in FIG. 6, when the piston is in its fully depressed position the retainer ring pair 82 is positioned with its "O" ring 87 at a location within the valve cavity between the apertures 76 and 77. The seal at such location thus provided prevents communication between the apertures 77 and the passageway 61 leading to the piston. It is to be noted that with the retainer ring pair 82 in such a position, the apertures 76 and, hence, the passageway 61 is in communication with that portion of the cavity above the retaining ring pair 82. An exhaust opening 92 leads from such cavity through the head portion 41 to the exterior environment. Thus, any pressure within the chamber 63 applied to face 37 of piston 32 is exhausted or vented to atmospheric pressure at this time.

At the same time the retainer ring pair 82 is positioned between the apertures 76 and 77, the retainer ring 86 and end disc 51 are positioned with their associated "O" ring 87 at a location below the apertures 79. Pressure from the external source is therefore communicated with the valve cavity above the retainer ring 86 via inlet passageway 44. The apertures 78 leading from the valve cavity and to the passageway 62 are also in that section of the valve cavity above the retainer ring. Thus, fluid pressure in such section is communicated through the passageway 62 and the insert sleeve 64 to the chamber 71 forwardly of the piston (and bore 66). In this connection, a large portion of such fluid pressure is communicated with the chamber 71 via the passage 68 and lateral passages 69 through the enlarged end portion 27 of the draw bar 24. The fluid providing such pressure will then flow through the passageway 72 into the air motor where it will react with the vanes thereof to cause rotation of its rotor prior to being exhausted through the exhaust ports 73.

It will be noted that during the flow of fluid through the passageway 72 to activate the motor, the pressure introduced into chamber 71 will also be applied on the face 38 of the piston 32. Such pressure will assure that the piston is moved to and maintained in a rear location within the casing portion 34 at which it is disengaged from the end portion 28 of the draw bar and not interfere with the rotation of the spindle.

It will be appreciated from the above that upon an operator depressing the actuating lever 52, the gripping means of the hand tool is automatically brought to a release position at which a tool implement or the like to be rotated can be inserted or removed from the apparatus prior to the rotation. In this connection, it is to be noted that a collet sleeve 96 is provided on the forward end of the spindle defining an aperture 97 through which the shank of a tool element must be inserted for it to be engaged by the collet. The aperture 97 includes around its periphery a resilient grip ring 98 whose function is to frictionally engage the shank of any tool implement engaged with the collet and tend to maintain such shank in position unless the implement is intentionally removed from the collet when it is in the release position. In those instances in which the collet is momentarily activated to the release position as an operator moves the lever through the intermediate position to its fully depressed condition, but it is not desired to change the tool, such ring will therefore assure that the tool remains in position within the collet.

It will also be noted that as an operator releases the actuator from its fully depressed position, the valve again goes through the mode at which it causes release of the tool implement being used. An operator can therefore change or replace a tool element at this time as well. In this connection, and as a salient feature of the invention, the piston 32 also acts as a brake to the rotation of the spindle so that an operator can quickly effect the tool implement change. To this end, a compression spring 99 is positioned between the head portion 41 and the piston 32. Upon release of fluid pressure within chamber 71, i.e., release of the actuating lever 52 from its fully depressed position, such spring will resiliently urge the piston forward within the cylindrical portion 34 and into engagement with the surface 39 on the end of the draw bar 24. The draw bar and the surface 39 associated thereby will be rotating with the spindle, whereas the piston will be stationary. Thus, such frictional engagement will result in a braking action being applied to the rotation. It will be noted that as the operator further decreases the depression on the actuating lever the valve will go through the mode depicted in FIGS. 2 and 5 in which pressure is applied to the surface 37 of the piston 32. This pressure will aid the compression spring 99 in urging the piston forward into engagement with the draw bar to cause the braking action.

While the invention has been described in connection with a preferred embodiment, it will be appreciated by those skilled in the art that various changes and modifications can be made without departing from its spirit. It is therefore intended that the protection afforded applicant be limited only by the claims and their equivalents.

I claim:

1. A fluid pressure operated hand tool comprising gripping means having jaws for gripping the shank of a tool implement or the like to which it is desired to impart rotary motion, driver means responsive to the application of fluid pressure thereto by rotating said gripping means and the tool implement held thereby, valve means for selectively directing fluid pressure to said driver means for powering the same, and release means for redirecting said fluid pressure and activating the jaws of said gripping means to a release position enabling insertion of the shank of a tool or the like for rotation.

2. The fluid pressure operated hand tool of claim 1 wherein means are provided for connecting said tool to an external source of fluid pressure, and said means for activating the jaws of said gripping means to a release position provides such activation in response to the application of fluid pressure thereto from said source.

3. The fluid pressure operated hand tool of claim 2 wherein manually operable actuating means are provided for controlling said valve means to direct said fluid pressure to said driver means, said actuating means also controlling the application of fluid pressure to said release means for activating the jaws of said gripping means to said release position.

4. The fluid pressure operated hand tool of claim 3 wherein said valve means for selectively directing fluid pressure to said driver means also selectively directs fluid pressure to said release means for activating the jaws of said gripping means to said release position, said actuating means being manipulatable to adjust said valve means between alternative modes respectively directing fluid pressure to said drive means and directing fluid pressure to said release means.

5. The fluid pressure operated hand tool of claim 4 wherein means are provided for maintaining the jaws of said gripping means in a gripping position for clamping engagement with the shank of a tool or the like whenever fluid pressure is not being applied to said release means.

6. The fluid pressure operated hand tool of claim 4 wherein said valve means comprises a valve spool which is axially slidable in the bore of a housing between a position at which said valve spool blocks communication between an external source of fluid pressure connected to said tool and said driver means while simultaneously providing communication between said source of fluid pressure and said release means, and a position at which said valve spool blocks communication between said source of pressure and said release means while simultaneously providing communication between said source of pressure and said driver means.

7. The fluid pressure operated hand tool of claim 6 wherein said gripping means comprises a collet which is received within an axial bore in the end of a spindle secured to said driver means for rotation thereby, said collet having an outwardly tapering exterior surface adjacent its gripping end which is cooperable with a complementary outwardly tapering surface on the interior of said bore for forcing the jaws of said collet radially inward to a tool shank gripping position upon said collet being withdrawn into said bore, said collet being normally resiliently urged to said withdrawn position within said bore, and wherein said release means comprises a piston responsive to the application of fluid pressure thereto by driving said collet against said resilient urging outwardly of said bore to disengage said complementary surfaces and allow the jaws of said collet to open for reception of the shank of a tool.

8. The fluid pressure operated hand tool of claims 7 wherein a collet draw bar is secured to the inner end of said collet and extends axially through said spindle to a location at which its free end is engageable by said piston of said release means to provide said outward movement of said collet to said release position.

9. The fluid pressure operated hand tool of claim 8 wherein said collet draw bar is secured to said collet for rotation therewith, and said piston is maintained out of engagement with said free end of said draw bar during application of fluid pressure to said driver means and corresponding rotation of said spindle and said collet.

10. The fluid pressure operated hand tool of claim 9 wherein means are provided for urging said piston into frictional engagement with the free end of said collet draw bar upon diversion of fluid pressure from said driver means whereby said frictional engagement provides a braking action on the rotational motion of said draw bar and thus of said spindle and collet.

11. The fluid pressure operated hand tool of claim 10 wherein said means urging said piston into engagement with said collet draw bar upon diversion of fluid pressure from said driver means is a compression spring and wherein fluid pressure is directed by said valve means to said piston to overcome the force of said compression spring and maintain said piston out of engagement with said collet bar when said pressure is being applied to said driver means.

* * * * *